United States Patent
Wang et al.

(10) Patent No.: US 7,701,673 B2
(45) Date of Patent: Apr. 20, 2010

(54) GIMBAL DESIGN WITH SOLDER BALL BOND PADS AND TRAILING EDGE LIMITER TAB FOR A RECORDING HEAD

(75) Inventors: Jeffery L. Wang, Hong Lok Yuen (HK); Hai Ming Zhou, Hong Lok Yuen (HK); Chi Hung Yuen, Kowloon (HK); Yen Fu, San Jose, CA (US); Hong Tian, Hong Lok Yuen (HK)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 808 days.

(21) Appl. No.: 11/131,651

(22) Filed: May 17, 2005

(65) Prior Publication Data

US 2006/0262456 A1 Nov. 23, 2006

(51) Int. Cl.
*G11B 5/48* (2006.01)
(52) U.S. Cl. .................. 360/245.3; 360/245; 360/245.9
(58) Field of Classification Search .............. 360/234.5, 360/245.3–245.9
See application file for complete search history.

(56) References Cited

U.S. PATENT DOCUMENTS

| | | | | |
|---|---|---|---|---|
| 5,896,247 A | * | 4/1999 | Pan et al. ................. | 360/234.5 |
| 6,351,348 B1 | * | 2/2002 | Erpelding et al. ......... | 360/244.3 |
| 6,515,832 B1 | * | 2/2003 | Girard ...................... | 360/245.3 |
| 6,801,398 B1 | * | 10/2004 | Ohwe et al. .............. | 360/234.6 |
| 7,480,120 B2 | * | 1/2009 | Huang et al. ............. | 360/245.3 |
| 2002/0075602 A1 | * | 6/2002 | Mangold et al. ......... | 360/245.7 |
| 2004/0032695 A1 | * | 2/2004 | Sassine et al. ........... | 360/245.7 |
| 2004/0143959 A1 | * | 7/2004 | Kamigama ............... | 29/603.03 |
| 2005/0036239 A1 | * | 2/2005 | Weber ...................... | 360/245.5 |
| 2006/0030180 A1 | * | 2/2006 | Tsai ........................... | 439/83 |

* cited by examiner

*Primary Examiner*—Brian E Miller
*Assistant Examiner*—Carlos E Garcia
(74) *Attorney, Agent, or Firm*—Saile Ackerman LLC; Stephen B. Ackerman

(57) ABSTRACT

A gimbal design for a hard disk drive are disclosed. In one embodiment, a gimbal tongue is supported by a gimbal cross bar coupled to a suspension body by a pair of gimbal struts. A pair of grounding pads are mounted on either side of the leading edge of the gimbal tongue. A first limiter tab is coupled to the leading edge of the gimbal tongue and a second limiter tab is coupled to the trailing edge of the gimbal tongue. Notches on either side of the trailing edge limiter tab increase the strength of the tab. One or more cutouts allow the slider to be electrically coupled to bonding pads on the opposite side of the gimbal tongue. Angled slots at the juncture of the gimbal cross bar and the gimbal tongue relieve stress on the gimbal.

11 Claims, 3 Drawing Sheets

GIMBAL DESIGN WITH SOLDER BALL BOND PADS AND TRAILING EDGE LIMITER TAB FOR A RECORDING HEAD

BACKGROUND INFORMATION

The present invention relates to magnetic hard disk drives. More specifically, the present invention relates to a gimbal design.

Hard disk drives are common information storage devices essentially consisting of a series of rotatable disks, or other magnetic storage mediums that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. The slider is held above the disks by a suspension. The suspension has a load beam and flexure allowing for movement in a direction perpendicular to the disk. The suspension is rotated around a pivot by a voice coil motor to provide coarse position adjustments. A micro-actuator couples the slider to the end of the suspension and allows fine position adjustments to be made.

In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The airflow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104, and greatly influences its ability to fly over the disk under various conditions. To control the in-plane motion of the slider, especially to access various data tracks on the disk surface, the head suspension assembly (HSA) typically incorporates a primary actuator. The primary actuator may be a voice coil located at the end opposite the read/write head. Due to the large inertia of the HSA, the primary actuator has limited bandwidth. Vibration of the suspension makes it difficult to control the read/write head position from a distance. The primary actuator along has difficulty achieving the speed and accuracy of position required.

Advanced disk drive design incorporates a secondary actuator, or micro-actuator, between the read/write head and the pivotal axis of the HSA. The stroke, or distance of displacement in relation to the voltage applied, of these micro-actuators is typically in the order of 1 μm. FIG. 2a illustrates a micro-actuator with a U-shaped ceramic frame configuration 201. The frame 201 is made of, for example, Zirconia. The frame 201 has two arms 202 opposite a base 203. A slider 204 is held by the two arms 202 at the end opposite the base 203. A strip of piezoelectric material 205 is attached to each arm 202. A bonding pad 206 allows the slider 204 to be electronically connected to a controller. FIG. 2b illustrates the micro-actuator as attached to an actuator suspension flexure 207 and load beam 208. The micro-actuator can be coupled to a suspension tongue 209. Traces 210, coupled along the suspension flexure 207, connect the strips of piezoelectric material 205 to a set of connection pads 211. Voltages applied to the connection pads 211 cause the strips 205 to contract and expand, moving the placement of the slider 204. The suspension flexure 207 can be attached to a base plate 212 with a hole 213 for mounting on a pivot via a suspension hinge 214. A tooling hole 215 facilitates handling of the suspension during manufacture and a suspension hole 216 lightens the weight of the suspension.

In most gimbal designs, epoxy potting and Gold Ball Bonding (GBB) are used to mount the slider and transducer to the suspension tongue. Epoxy has a tendency to expand when exposed to a high ambient temperature, causing slider crown change and affecting the slider flying height above the disks. GBB requires a large force to be applied on the suspension, and may lead to changes in the pitch static attitude. Moreover, sparks may occur causing damage to the transducers, which are highly sensitive to Electrostatic Discharge (ESD).

DETAILED DESCRIPTION

A gimbal design for a hard disk drive is disclosed. In one embodiment, a gimbal tongue may be supported by a gimbal cross bar coupled to a suspension body by a pair of gimbal struts. A pair of grounding pads may be mounted on either side of the leading edge of the gimbal tongue. A first limiter tab may be coupled to the leading edge of the gimbal tongue and a second limiter tab may be coupled to the trailing edge of the gimbal tongue. Notches on either side of the trailing edge limiter tab may increase the strength of the tab. One or more cutouts may allow the slider to be electrically coupled to bonding pads on the opposite side of the gimbal tongue. Angled slots at the juncture of the gimbal cross bar and the gimbal tongue may relieve stress on the gimbal.

Figure 1:
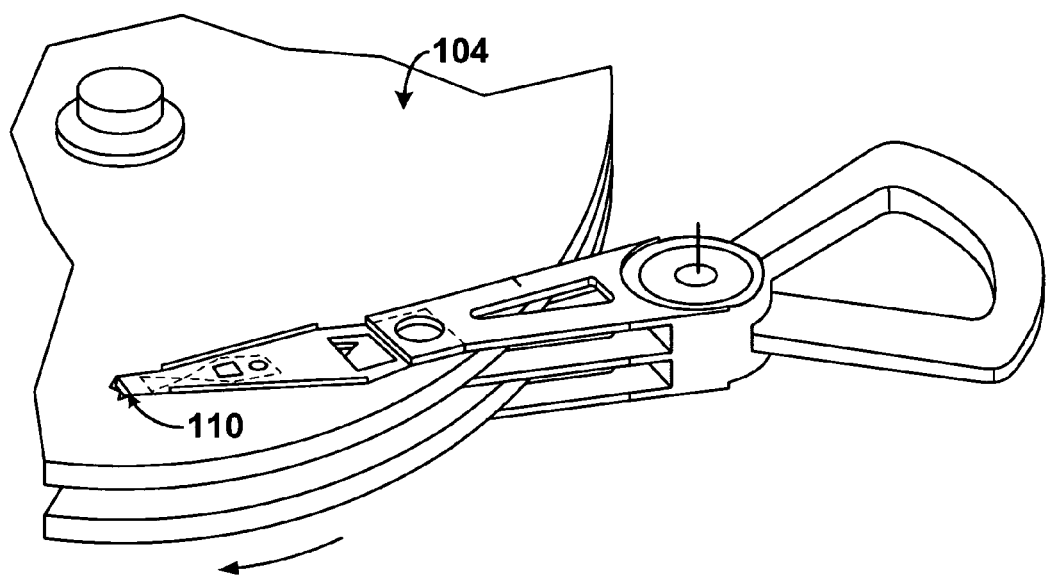
FIG. 1 provides an illustration of a typical disk drive.
Figure 2A:
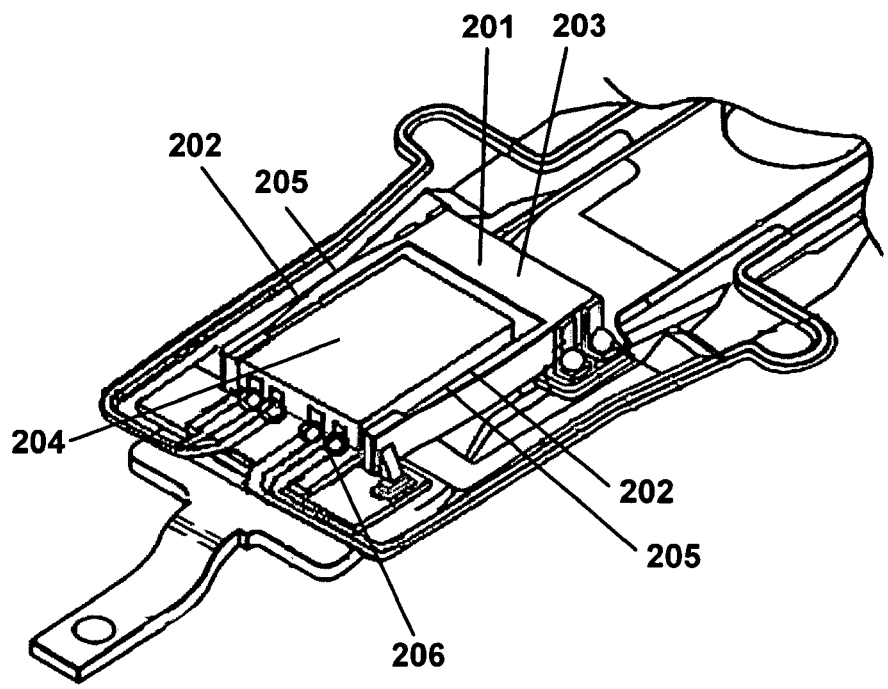
FIGS. 2a-b provide an illustration of an actuator as practiced in the prior art.
Figure 2B:
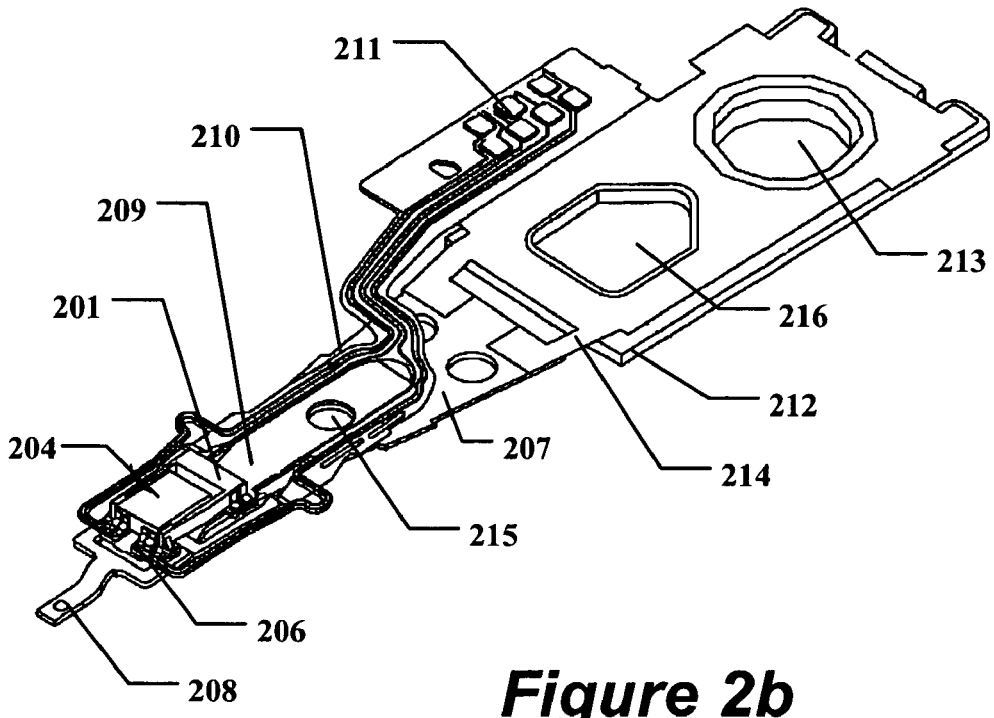
Figure 3:
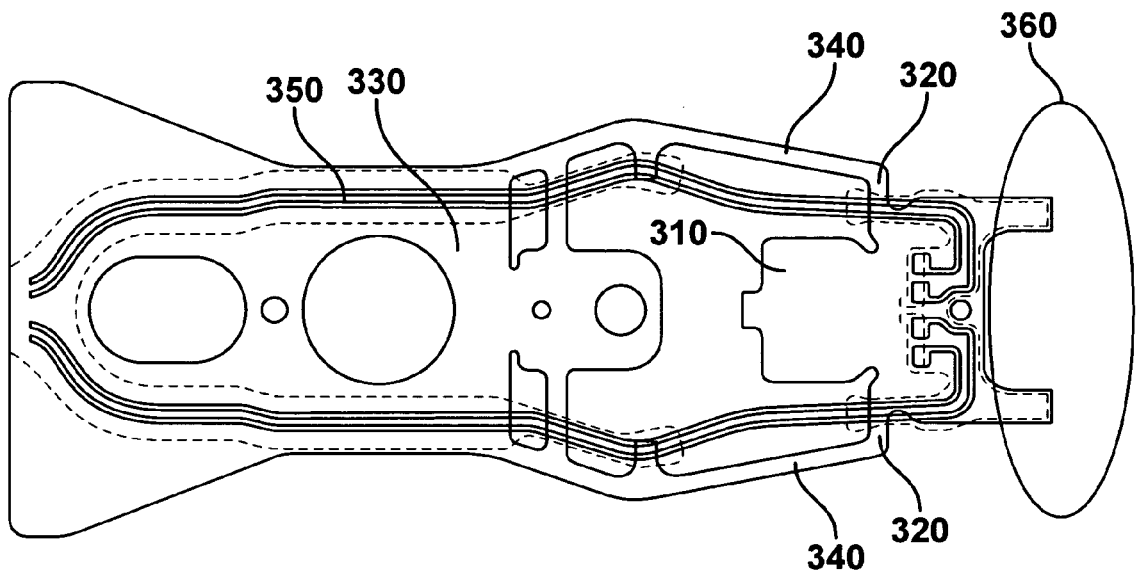
FIG. 3 provides an illustration of a bottom view of one embodiment of a gimbal according to the present invention.

FIG. 3 illustrates one embodiment of a gimbal as constructed in the present invention. The gimbal may have a gimbal tongue 310 upon which a slider with a magnetic read/write head may be mounted. The gimbal tongue 310 may be supported by a gimbal cross bar 320. The gimbal cross bar 320 is coupled to a suspension body 330 by a pair of gimbal struts 340. The gimbal struts 340 may be coupled at one end to the corners of the suspension body 330 and at the other end to each end of the gimbal cross bar 320. A series of traces 350 running along the top of the gimbal assembly may electrically couple the gimbal tongue 310 to a preamplifier on the suspension body 330. A trailing edge limiter tab 360 may be coupled to the gimbal tongue 310. The trailing edge limiter tab 360 is typically used to improve shock resistance in ramp load and unload drives.

Figure 4:
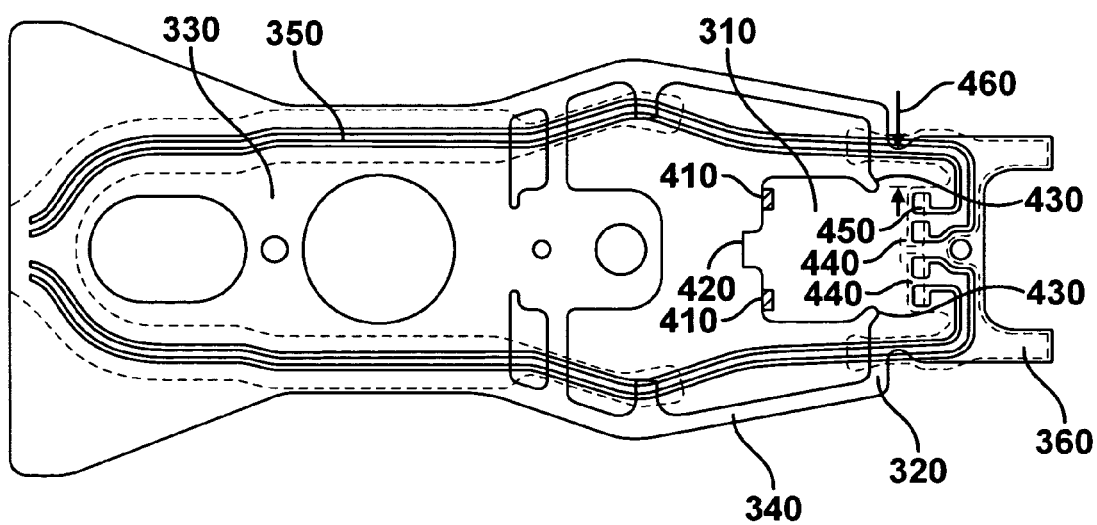
FIG. 4 provides an illustration of a bottom view of one embodiment of a gimbal with solder ball bonding pads according to the present invention.

FIG. 4 illustrates one embodiment of a gimbal with grounding pads as constructed in the present invention. A grounding pad 410 is placed at each corner of the leading edge of the gimbal tongue. A leading edge limiter 420 may be added to the leading edge of the gimbal tongue, between the two grounding pads 410. Placing the limiter 420 between the grounding pads 410 may help the solder bonding of the grounding pads 410 to avoid direct impact when the limiter 420 is engaged during a shock event, giving the gimbal a higher shock resistance. Stress relief slots 430 may be placed at the junction of the gimbal cross bar 320 and the gimbal tongue 310. The stress relief slots 430 may be at an angle to an axis along the slider length. The stress relief slots 430 may provide better balance between the strength of the trailing edge limiter and the gimbal stiffness. One or more solder ball bonding cutouts 440 may be made into one end of the gimbal tongue 310. The cutouts 440 allow the slider, and more importantly the magnetic read/write head in the slider, to be electrically bonded to one or more bonding pads 450 present on the other side of the gimbal tongue 310. The one or more bonding pads 450 are electrically coupled to the series of traces 350, allowing the slider to be electrically coupled to a pre-amplifier. The cutouts 440 may be shaped to prevent shorting to occur between the solder ball and the stainless steel material. A notch 460, offset from the cutout 440, may be made on either side of the trailing edge limiter tab 360 to strengthen the trailing edge limiter tab 360.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A head gimbal assembly, comprising:
   a gimbal tongue with a leading edge to support a slider; wherein
   a leading edge limiter tab extends away from a center of said leading edge of said tongue thereby providing shock resistance; and wherein
   symmetrically placed angled slots extend inward from peripheral edges of said gimbal tongue, providing a stress-relief and stiffening mechanism;
   a suspension body to position the gimbal tongue above a data storage medium;
   a first grounding pad on a first corner of the leading edge of the gimbal tongue;
   a second grounding pad on a second corner of the leading edge of the gimbal tongue;
   a gimbal cross bar coupled to the gimbal tongue; and
   a first gimbal strut extending away from said gimbal cross bar at a first corner of the suspension body in a trailing edge direction and forming a first trailing edge limiter for shock resistance and a second gimbal strut extending away from said gimbal cross bar at a second corner of the suspension body in a trailing edge direction and forming a second trailing edge limiter for shock resistance and wherein said struts form substantially perpendicular notches where they meet said gimbal cross bar, thereby strengthening said trailing edge limiters.

2. The head gimbal assembly of claim 1, further comprising:
   one or more bonding pads on a side of the gimbal tongue opposite the slider to electrically bond the slider to the gimbal; and
   one or more solder ball bond cutouts to partially expose the one or more bond pads to the slider and shaped to prevent shorting of a solder ball bond, wherein said one or more solder ball bond cutouts are located on the trailing edge side of said substantially perpendicular notches, thereby not adversely affecting the stiffness of said tongue.

3. The head gimbal assembly of claim 2, wherein the gimbal cross bar is coupled to the gimbal tongue between the one or more bonding pads and the leading edge.

4. The head gimbal assembly of claim 3, wherein said substantially perpendicular notches are offset from the one or more solder ball bond cutouts.

5. A hard disk drive, comprising:
   A data storage disk;
   A slider containing a magnetic read/write head to read and write data from the data storage disk;
   a gimbal tongue with a leading edge to support a slider; wherein
   a leading edge limiter tab extends away from a center of said leading edge of said tongue thereby providing shock resistance; and wherein
   symmetrically placed angled slots extend inward from peripheral edges of said gimbal tongue, providing a stress-relief and stiffening mechanism;
   a suspension body to position the gimbal tongue above a data storage medium;
   a first grounding pad on a first corner of the leading edge of the gimbal tongue;
   a second grounding pad on a second corner of the leading edge of the gimbal tongue;
   a gimbal cross bar coupled to the gimbal tongue; and
   a first gimbal strut extending away from said gimbal cross bar at a first corner of the suspension body in a trailing edge direction and forming a first trailing edge limiter for shock resistance and a second gimbal strut extending away from said gimbal cross bar at a second corner of the suspension body in a trailing edge direction and forming a second trailing edge limiter for shock resistance and wherein said struts form substantially perpendicular notches where they meet said gimbal cross bar, thereby strengthening said trailing edge limiters.

6. The hard disk drive of claim 5, further comprising:
one or more bonding pads on a side of the gimbal tongue opposite the slider to electrically bond the slider to the gimbal; and
one or more solder ball bond cutouts to partially expose the one or more bond pads to the slider and shaped to prevent shorting of a solder ball bond, wherein said one or more solder ball bond cutouts are located on the trailing edge side of said substantially perpendicular notches, thereby not adversely affecting the stiffness of said tongue.

7. The hard disk drive of claim 6, wherein the gimbal cross bar is coupled to the gimbal tongue between the one or more bonding pads and the leading edge.

8. The hard disk drive of claim 7, wherein said substantially perpendicular notches are offset from the one or more solder ball bond cutouts.

9. A method, comprising:
supporting a slider above a data storage medium using a gimbal tongue with a leading edge; wherein
a leading edge limiter tab extends away from a center of said leading edge of said tongue thereby providing shock resistance; and wherein
symmetrically placed angled slots extend inward from peripheral edges of said gimbal tongue, providing a stress-relief and stiffening mechanism; then
positioning the gimbal tongue above the data storage disk using a suspension body;
grounding the slider using a first grounding pad on a first corner and a second grounding pad on a second corner of the leading edge of the gimbal tongue
supporting the gimbal tongue with a gimbal cross bar; and
supporting the gimbal cross bar with a first and second gimbal strut coupled to the suspension body,
wherein the first gimbal strut extends away from said gimbal cross bar at a first corner of the suspension body in a trailing edge direction and forming a first trailing edge limiter for shock resistance and a second gimbal strut extending away from said gimbal cross bar at a second corner of the suspension body in a trailing edge direction and forming a second trailing edge limiter for shock resistance and wherein said struts form substantially perpendicular notches where they meet said gimbal cross bar, thereby strengthening said trailing edge limiters.

10. The method of claim 9, further comprising:
partially exposing one or more bond pads to the slider using one or more solder ball bond cutouts; and
electrically coupling the slider to the one or more bond pads.

11. The method of claim 10, wherein the gimbal cross bar is between the one or more bonding pads and the leading edge of the gimbal tongue.

* * * * *